No. 803,932. PATENTED NOV. 7, 1905.
A. SMELKER.
JAR NECK AND CLOSURE.
APPLICATION FILED MAY 22, 1905.
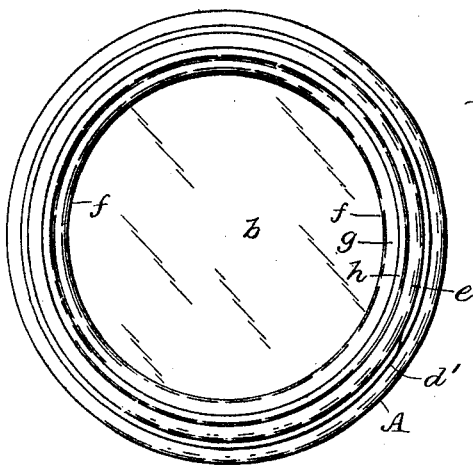
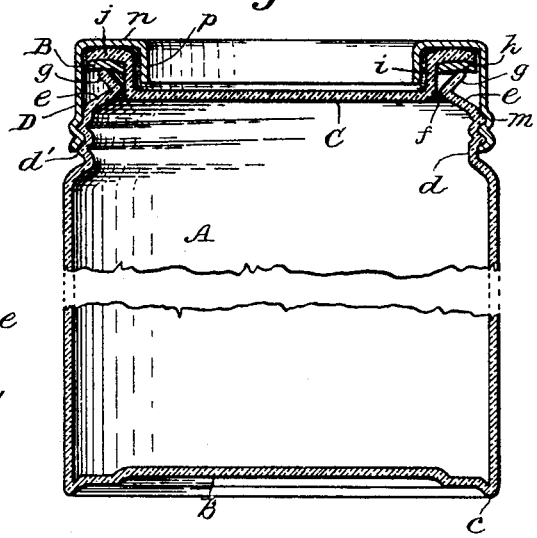
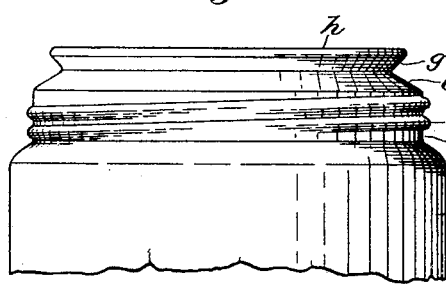
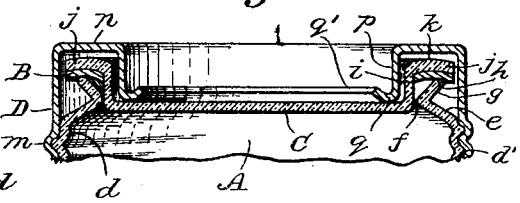
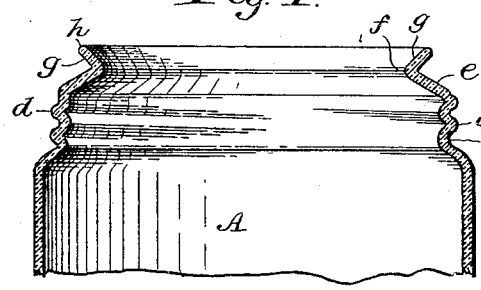
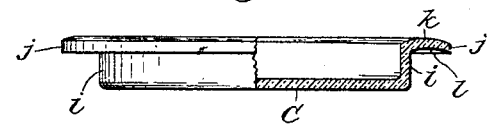
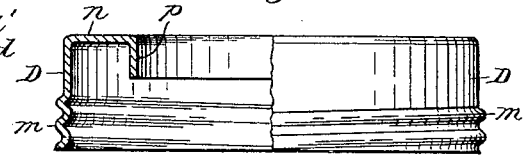
Witnesses:
Wm E Thompson
Stella Snider
Inventor.
Angeline Smelker,
by
E. T. Silvius,
Attorney.

UNITED STATES PATENT OFFICE.

ANGELINE SMELKER, OF GREENVILLE, OHIO, ASSIGNOR OF ONE-THIRD TO MARY M. MEHRING, OF INDIANAPOLIS, INDIANA.

JAR NECK AND CLOSURE.

No. 803,932. Specification of Letters Patent. Patented Nov. 7, 1905.

Application filed May 22, 1905. Serial No. 261,482.

*To all whom it may concern:*

Be it known that I, ANGELINE SMELKER, a citizen of the United States, residing at Greenville, in the county of Darke and State of Ohio, have invented new and useful Improvements in Jar Necks and Closures; and I do declare the following to be a full, clear, and exact description of the invention, reference being had to the accompanying drawings, and to the letters of reference marked thereon, which form a part of this specification.

This invention relates to fruit-jars and the like; and it has reference particularly to the upper portion thereof, including the neck and mouth, the lid, and the retaining-ring for holding the lid on the sealing-ring.

The object of the invention is to provide jars and lids that may be cheaply made of glass, which may be reliably sealed, and which may be easily unsealed and opened without danger of injury to the person who may remove the lid, a particular object being to provide jar-closures that will not be liable to stick fast so much as to make it difficult to remove the lid.

With the above and other objects in view the invention consists in the specific novel forms of construction and the parts and combinations and arrangements of parts, as hereinafter particularly described and claimed.

Referring to the drawings, Figure 1 is a top plan of a fruit-jar containing the improvements in the top thereof; Fig. 2, a vertical central sectional view showing the complete jar and closure, a portion of the jar-body being broken out; Fig. 3, a fragmentary side elevation of the jar; Fig. 4, a fragmentary vertical central sectional view of the jar; Fig. 5, a fragmentary vertical central sectional view of the complete jar and closure, in which the retaining-ring is slightly modified in form and mode of operation; Fig. 6, a side elevation of the jar-lid, partly in central sectional elevation; and Fig. 7, a side elevation of the retaining-ring, partly in central sectional elevation.

Like reference characters designate like parts or features in the several figures of the drawings.

In a practical embodiment of the invention the whole jar proper is composed of glass, the body A of which is circular and having a bottom $b$, at the edge of which is an annular rib $c$ to prevent the jar from sliding from the top of another when placed thereon for storage purposes. At the upper portion of the body it has a neck $d$, provided with screw-threads $d'$, immediately above which the walls are contracted, so as to form an inclined portion $e$, extending inwardly and upwardly from the top of the threaded neck, thus forming a contracted throat $f$ for guiding the jar-lid centrally in the mouth of the jar, for the purpose of holding the sealing-ring fairly upon the sealing-seat. The throat $f$ has less diameter than any other portion of the jar structure, and from the throat the walls extend outwardly and upwardly, forming a funnel-shape part $g$ immediately above the throat, the top part $g$ being rounded in molding the same and forming a sealing-seat $h$, on which the elastic sealing or packing ring is to be placed in effecting the sealing. The seat $h$ is concentric to the outer side of the neck $d$ and the inner side of the throat $f$, being in a circle approximately midway between those parts, the relative arrangement being devised with reference to adaptability for inexpensive production as well as to utility.

The sealing-ring B is formed, as usual, of such material as rubber composition of annular form, and in the interest of economy must contain the minimum practicable amount of material, so that being relatively narrow and liable to creep when forced on a seat must be held fairly on the seat in order to insure reliable sealing effects. The internal diameter of the ring B is substantially the same or slightly less than the internal diameter of the throat $f$, and the external diameter of the ring is substantially the same or slightly less than the external diameter of the jar-neck $d$ at the bottoms of the screw-threads $d'$.

The lid C is preferably composed of glass and is approximately of dish form, the plate or main part of which is designed to normally rest in the plane of the throat $f$, the lid having a rim $i$, at the top of which is a flaring flange $j$, that is slightly curved so as to provide an arched top $k$ and under side $l$, the top being convex and the under side concave in cross-section. The rim $i$ is flange-like at right angles to the plate part of the lid and the external diameter of the rim and the plate part are equal, being slightly less than the internal diameter of the throat $f$, so that the throat will form a guide for the lid to hold the flange $j$ centrally on the seat $h$, or approximately so, the flange extending outwardly beyond the seat when placed thereon.

The retaining-ring D is composed of metal, circular in form, as a band, one end being open and provided with screw-threads $m$, and the other end being partially closed by an inwardly-extending right-angled flange $n$, at the inner edge of which is a right-angled flange $p$, extending toward the threaded end of the ring for stiffening the flange $n$, and in some cases the flange $p$ has a rib-like curved end $q$, having a turned-over edge $q'$. When so preferred, the rib-like end is designed to bear on the plate part of the lid C, and in some cases the flange $p$ may be shortened in construction, so that the flange $n$ may bear on the convex top $k$ of the flange $j$, over which the flange $n$ extends when in place thereon, the flange $p$ extending downwardly near the flange $i$ of the lid.

In practical use the jar may be filled with warm fruit or other substance that is to be preserved. Then the sealing-ring B is to be placed on the lid C, extending about the flange $i$ adjacent to the flange $j$ thereof, the ring being close-fitting, so as to be held in such position, when the lid may be placed in position to close the jar, the throat $f$ guiding the lid, so that the ring B will rest fairly on the seat $h$, after which the retaining-ring may be screwed down on the threads $d''$ to secure the lid, and thereby complete the sealing, and relatively little force will be required to make a tight joint on the narrow seat $h$.

In case all parts are not accurately formed, as may be found in practice, the retaining-ring may yield slightly until all portions of the bearing parts thereof find contact with the lid whether of the form that engages the flange $j$ or that which engages the plate portion of the lid. When it becomes necessary to unseal the jar, the retaining-ring B may be turned easily, as it will slide freely on the glass lid and threads, and in case the sealing-ring adheres to the seat $h$ ready access may be had for loosening the ring, which will adhere more firmly to the broader surface of the flange $j$ of the lid and be retained on the lid, and therefore will not be liable to become misplaced. When the jar is free of the fruit, the jar will be a convenient temporary receptacle for various spices or other articles, the lid providing a convenient cover without using the retaining-ring. The lid is to be handled by grasping it at its outer edges.

Having thus described the invention, what is claimed as new is—

1. A jar having a neck, the walls of the jar being bent inwardly above the neck and forming a contracted throat, and thence bent outwardly and having a sealing-seat at the top end thereof, in combination with a lid guided by said throat and having a flange extending outwardly over said seat, and a sealing-ring between said seat and said flange, substantially as and for the purposes set forth.

2. A jar-lid having a lateral right-angled flange provided with an outwardly-projecting flange extending from the end thereof, in combination with a jar-neck having a sealing-seat and a contracted throat below the plane of the seat guiding the lid with said projecting flange centrally over said seat, a sealing-ring between said seat and said projecting flange, and a retaining-ring for said lid.

3. A jar-lid comprising a plate part having a lateral right-angled flange at the periphery thereof, and an outwardly-projecting flange extending laterally from the end of the lateral flange and formed concavo-convex in cross-section, in combination with a jar-neck having a sealing-seat and a contracted throat below the plane of the seat guiding the lid with said projecting flange centrally over said seat, a sealing-ring between said seat and said projecting flange, and a retaining-ring engaging the top of said projecting flange.

4. A jar comprising a threaded neck having a contracted throat in a plane above the threads of the neck, and having a funnel-shape mouth extending from said throat with a sealing-seat on the broader portion thereof, a lid guided by said throat and having a lateral right-angled flange at the end of which is a flaring lateral flange extending over said seat, a sealing-ring sprung over said lateral flange against said flaring flange and bearing on said seat, and a retaining-ring engaging said threaded neck and said lid, substantially as and for the purposes set forth.

In testimony whereof I affix my signature in presence of two witnesses.

ANGELINE SMELKER.

Witnesses:
Wm. C. Thompson,
E. T. Silvius.